US011958025B2

(12) United States Patent
Müller et al.

(10) Patent No.: US 11,958,025 B2
(45) Date of Patent: Apr. 16, 2024

(54) DEVICE FOR MIXING LIQUIDS AND SOLIDS WITH LIQUIDS BY MEANS OF VIBRATION

(71) Applicant: DRM, Dr. Müller AG, Männedorf (CH)

(72) Inventors: Patrick Müller, Meilen (CH); Kevin Wetter, Teufen (CH)

(73) Assignee: DRM, Dr. Müller AG, Männedorf (CH)

( * ) Notice: Subject to any disclaimer, the term of this patent is extended or adjusted under 35 U.S.C. 154(b) by 789 days.

(21) Appl. No.: 17/058,593

(22) PCT Filed: May 20, 2019

(86) PCT No.: PCT/IB2019/054137
§ 371 (c)(1),
(2) Date: Nov. 24, 2020

(87) PCT Pub. No.: WO2019/234534
PCT Pub. Date: Dec. 12, 2019

(65) Prior Publication Data

US 2021/0197149 A1 Jul. 1, 2021

(30) Foreign Application Priority Data

Jun. 6, 2018 (CH) .................................... 00721/18

(51) Int. Cl.
*B01F 31/441* (2022.01)
*H01F 7/02* (2006.01)
(Continued)

(52) U.S. Cl.
CPC .............. *B01F 31/441* (2022.01); *H01F 7/02* (2013.01); *B01F 31/27* (2022.01); *B01F 35/325* (2022.01)

(58) Field of Classification Search
CPC ....... B01F 31/441; B01F 31/27; B01F 35/325
(Continued)

(56) References Cited

U.S. PATENT DOCUMENTS 3,399,869 A * 9/1968 Suhre .................... B01F 33/452 366/115
5,730,856 A * 3/1998 Omasa ..................... B01J 19/10 205/742
(Continued)

FOREIGN PATENT DOCUMENTS

CH 289065 4/1951
DE 1119994 12/1961
(Continued)

OTHER PUBLICATIONS

International Search Report issued by the European Patent Office in International Application PCT/IB2019/054137 dated Sep. 18, 2019.

*Primary Examiner* — Marc C Howell
(74) *Attorney, Agent, or Firm* — Henry M. Feiereisen LLC

(57) ABSTRACT

A device for mixing liquids and solids in liquids using vibration includes an electromagnetic drive, a drive shaft arranged coaxially with the electromagnetic drive, with drive shaft having a mixing member and either a permanent magnet or a magnetisable element excited by the electromagnetic drive to cause vibration for transmission to the mixing member, and a system of flat spring elements including a first spring element arranged parallel to the drive shaft and a second spring element arranged perpendicularly to the drive shaft and connected to the permanent magnet or the magnetisable element.

11 Claims, 3 Drawing Sheets

(51) Int. Cl.
*B01F 31/20* (2022.01)
*B01F 35/32* (2022.01)

(58) Field of Classification Search
USPC .......................................................... 366/273
See application file for complete search history.

(56) References Cited

U.S. PATENT DOCUMENTS

| | | | | |
|---|---|---|---|---|
| 2001/0053332 | A1* | 12/2001 | Omasa ...................... | A61L 2/10 422/23 |
| 2003/0124990 | A1 | 7/2003 | Kawano et al. | |
| 2004/0027912 | A1* | 2/2004 | Bibbo ................... | B01F 31/441 366/314 |
| 2004/0195090 | A1* | 10/2004 | Omasa ................... | C25D 5/611 204/279 |
| 2005/0011765 | A1* | 1/2005 | Omasa ...................... | C25B 9/17 204/242 |
| 2007/0253288 | A1* | 11/2007 | Mennenga ............ | B01F 33/453 366/274 |
| 2017/0333857 | A1* | 11/2017 | Barksdale ............. | B01F 33/453 |

FOREIGN PATENT DOCUMENTS

| | | |
|---|---|---|
| DE | 26 12 568 | 9/1976 |
| EP | 0 626 194 | 11/1994 |
| WO | WO 2009/095852 | 8/2009 |

* cited by examiner

DEVICE FOR MIXING LIQUIDS AND SOLIDS WITH LIQUIDS BY MEANS OF VIBRATION

CROSS-REFERENCES TO RELATED APPLICATIONS

This application is the U.S. National Stage of International Application No. PCT/IB2019/054137, filed May 20, 2019, which designated the United States and has been published as International Publication No. WO 2019/234534 A1 and which claims the priority of Swiss Patent Application, Serial No, 00721/18, filed Jun. 6, 2018, pursuant to 35 U.S.C. 119(a)-(d).

BACKGROUND OF THE INVENTION

The invention relates to a device for mixing liquids, and liquids with gases or solids by vibration.

Known devices for mixing liquids by vibration have a mass-spring system which is made to vibrate by an electromagnetic drive (referred to hereinafter as an electromagnet) and is connected to a mixer plate by a shaft. The spring system is electromagnetically coupled to the electromagnet, which is actuated by an alternating current or current pulses and causes the mass-spring system to vibrate. The resulting (vertical) deflections in the direction of the attracting and repelling force of the magnetic field on the spring system are transmitted by a drive shaft to the mixer plate in the mixing medium. In order to achieve the highest possible efficiency, the vibrating system must oscillate to the greatest possible extent in its resonance, as this minimises the required excitation force of the drive. This resonance frequency can be varied and optimised for the particular application by clever design of the spring elements of the mass and the damping values.

Such a system is known from the prior art by the terms vibromixer and vibratory mixing drive and is disclosed, for example, in CH 289065. As an example from the industry, the vibromixer under the name FUNDAMIX® of the company DrM Dr. Müller AG is mentioned here. Usually, vibromixers of this type are operated at a vibration frequency of 50-100 Hz and an amplitude of 1-5 mm. Mixing elements, which will not be discussed in detail here, are designed for unidirectional oscillation movement and achieve an equally good mixing performance in relation to conventional rotary mixers.

According to the prior art, the spring system of such a vibromixer usually consists of one or more coil springs. The springs, which are usually made of spring steel, withstand the constant alternating load and, given their geometric dimensions, are fixed to one spring force. This can be adjusted by changing the preload of the springs, which requires great effort, especially when using a larger number of coil springs. The resonance frequency of the spring system is determined by the mass and damping of the system and can therefore only be changed by replacing the springs or extending the spring assembly. If there are a plurality of springs in the system, the spring forces of a plurality of springs in the system may vary due to the smallest of differences in material, temperature or geometry of the springs. This leads to an uneven distribution of the forces and impairs the vibration behaviour of the system. The mounting of coil springs is mechanically difficult to implement and can lead to disturbing noise during operation. This noise source can only be suppressed with complex measures, such as silencers or surface treatment of the contact points to the spring. Both methods are costly and can have a detrimental effect on the resonance behaviour of the vibration system and the service life of the springs.

Another prior-art device is disclosed in EP 0626194A1. A microscope slide is supported by a plurality of leaf springs connected in series so that it can vibrate in three dimensions. The vibration is excited by the actuation of coils which exert a force on permanent magnets connected to the individual vibrating springs. In order to adjust the vibration behaviour, the spring constants of the springs can be varied in all directions, which is achieved by superimposing another spring system on the springs. The series connection of a spring rod is mentioned here, whose spring constant can be changed by an adjustable vibrating mass or an adjustable guide fork. In the document it is pointed out that the vibrating apparatus is usually operated at high frequencies up to 20 kHz. Areas of application are mixing, homogenisation and separation of liquids and solids on a laboratory scale. The mechanical construction of the spring system and the device for adjusting the spring constant by means of an additional vibrating rod are elaborate, complicated and take up a lot of space. The applications are limited to the mixing of smaller quantities of liquids and solids. The masses and amplitudes are small and the frequencies are high, designed for the particular process on a laboratory scale. However, a full-scale design for larger volumes, amplitudes, weights and mixing capacities would require enormous effort. Especially the device for adjusting the spring constants would no longer be economically feasible in a scale-up.

The object of the present invention is to create a device for mixing liquids and solids in liquids by means of vibration, in which a drive shaft is excited to oscillate in a main direction by means of an electromagnetic drive via a spring system. The device is to be designed in such a way that even greater forces and amplitudes of several millimetres can be achieved at a frequency of up to 200 Hz. Compared to the prior art, the mechanical construction of the spring system should be optimised in such a way that the known problems are reduced or prevented.

SUMMARY OF THE INVENTION

According to the invention, the object is achieved by a device for mixing liquids and solids in liquids by means of vibration, which device has an electromagnetic drive, either a permanent magnet or a magnetisable, for example a ferritic element, and a drive shaft arranged coaxially with the electromagnetic drive. In particular, the device comprises a system of spring elements with one or more flat spring elements. The spring system allows vibration in one direction of oscillation, namely the main direction coaxial with the drive shaft and the electromagnetic drive, and is centrally excited to oscillate by an external force. This excitation force is generated by an electromagnetic drive, which transmits a force to a permanent magnet or a magnetisable element through a magnetic coupling. The permanent magnet or the magnetisable element is connected to the spring system and enables the excitation to vibrate. If the device according to the invention has a permanent magnet, i.e. with a permanent pole, the permanent magnet will resonate with the input frequency of the electromagnetic coil of the electromagnet. If the device according to the invention has a magnetisable element instead, this element is magnetised by the electromagnetic coil of the electromagnet and thus vibrates at twice the input frequency of the electromagnet. The load condition of the unidirectional oscillation is given by the main forces along the vibration amplitude along the induced magnetic force, which are transmitted to the drive shaft and thus to a mixing member attached to the drive shaft. Transverse forces acting perpendicularly to the direction of oscillation are also generated, given by external forces from the drive shaft and mixing member as well as forces resulting from a not perfectly symmetric arrangement of the components. The flat spring elements, which are designed for bend and torsional load, can be arranged in such a way that they optimally absorb the main or transverse forces. For this purpose, first flat spring elements are arranged parallel to the main direction and to the drive shaft and furthermore, second flat spring elements are arranged perpendicularly to the main direction and to the drive shaft. The latter second spring elements are connected to the permanent magnet or the magnetisable element. If a flat spring element had to absorb both types of force, i.e. forces in the oscillation or main direction as well as transverse forces perpendicular to the main direction, this would not only result in bending and torsion, but also in additional tensile and compressive load along the spring axis and thus in suboptimal loading of the material. The combination of flat spring elements thus enables the optimum distribution of the loading forces in the vibration system.

In one embodiment of the invention, the system of flat spring elements comprises a plurality of interconnected flat spring elements oriented perpendicularly to each other, or one or more curved flat spring elements.

In one embodiment, the curved spring elements are each L-shaped. In one embodiment, the system has two L-shaped curved spring elements, with each of the two L-shaped spring elements comprising a first spring element oriented parallel to the drive shaft and a second spring element oriented perpendicularly to the drive shaft.

In a further embodiment, a curved flat spring element is U-shaped, A U-shape is understood to mean a one-piece spring element comprising two spring elements oriented parallel to the drive shaft and one spring element oriented perpendicularly to the drive shaft.

In one embodiment of the invention, the spring elements contain highly resilient, elastic material, such as spring steel or fibre-reinforced plastic.

In one embodiment of the invention, the second spring elements are attached to and supported on the wall of a housing by means of clamping jaws.

In one embodiment of the invention, the first spring elements are attached to and supported on the permanent magnet or magnetisable element by means of clamping jaws.

In one embodiment of the invention, the clamped lengths and widths of the spring elements in the clamping jaws and/or the distance of the spring elements from the electromagnetic drive are adjustable.

In a further embodiment of the invention, the first spring elements, parallel to the main direction and to the drive shaft, are each realised by a damping block which absorbs the transverse forces. Damping blocks, also known as silent blocks, are to be understood as damping elements with a multilayer structure comprising two metal plates and a shock-absorbing material arranged between the two metal plates. The shock-absorbing material is, for example, rubber or plastic foam and absorbs the transverse forces in the second spring element perpendicularly to the drive shaft. The damping blocks are attached directly to the wall of a housing.

Flat spring elements can be produced expediently in various materials and with tight geometry and material tolerances. The material is usually spring steel or fibre-reinforced plastic. The latter offers increased resistance to alternating load while at the same time offering high strength and a low weight. In addition, the modulus of elasticity and thus the vibration behaviour of the leaf spring can be pre-selected by selecting the appropriate plastic. The flat spring elements show an enormous durability in the described load condition even under high alternating load. They are also compact and lightweight compared to conventional coil springs. The mounting and fixing of the flat springs is simple, easy to assemble, and, given the compactness and the defined clamping of the springs, generates hardly any noise. The separate division of the spring elements according to the forces that occur allows flexible and simple adjustment of the clamped spring lengths and the position of the spring system in relation to the excitation force. This allows fine adjustment of the resonance frequency of the system and the best possible utilisation of the electromagnetic drive. Asymmetries of the components and groups can be compensated by the flexible clamping of the spring elements and allow an optimal vibration behaviour.

The design of the spring system of the device according to the invention enables also larger forces and amplitudes of several millimetres to be achieved at a frequency of up to 200 Hz. The device can be used for mixing and homogenising volumes in the order of 10,000 L.

The use of a permanent magnet or a magnetisable element as an antipole to the electromagnetic drive can have advantages depending on the application. With the use of a permanent magnet, the device according to the invention generates half the vibration frequency compared to the device with a magnetisable element under otherwise identical conditions. Particularly at lower operating frequencies, the use of permanent magnets can thus increase drive efficiency, since the electromagnetic drive can usually be operated more efficiently at higher input frequencies. The mechanical and thermal properties of the magnetisable element, usually consisting of ferritic material, or the permanent magnet, usually neodymium-iron-boron compounds, can also be used to advantage depending on the application requirements.

The advantages of the device according to the invention are that the service life and possible operating time of the loaded spring elements are increased because the load on the spring elements is optimally distributed due to the design according to the invention. During operation of the device, there is a reduced generation of noise, which otherwise occurs at the high operating frequencies due to coil springs and their mounting. In addition, the weight and space requirements of the spring system are reduced compared to prior-art devices, and the costs of manufacture are reduced due to lower component costs and simpler assembly and system adjustment. The maintenance of the device according to the invention as well as the high effort for setting the operating parameters can be reduced by the simpler construction and the flexible clamping mechanism.

BRIEF DESCRIPTION OF THE DRAWING

The invention will be described in greater detail with reference to the figures.

In the figures.

DETAILED DESCRIPTION OF PREFERRED EMBODIMENTS

Figure 1:
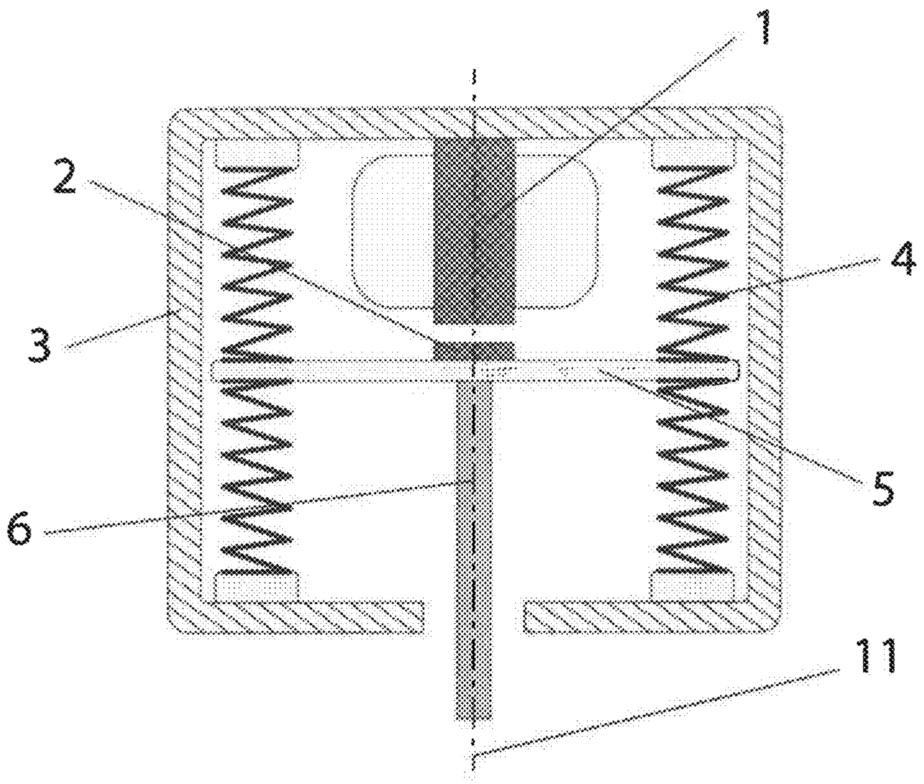
Fig. 1 (Prior Art)
FIG. 1 shows a cross-section of the drive element of a vibration mixer according to the prior art.

FIG. 1 shows a drive for a prior-art liquid-mixing device in simplified form. Here, the electromagnetic drive 1 is firmly connected to a rigid frame, a chassis 3. A rigid plate 5 is thus connected and supported by one or more coil springs 4 to ensure optimum support, and the springs 4 can be arranged either in parallel or in series. A permanent magnet or magnetisable element 2 is connected to the plate 5 and is excited by the magnetic coupling by the electromagnet 1, so that the springs 4 start to vibrate. The plate 5 is supported by the springs 4 so that it can vibrate freely in the main direction. The main direction along line 11 is defined by the force effect of the electromagnet 1 on the permanent magnet or the magnetisable element 2 on the steel plate 5. A shaft 6 connected to the steel plate thus resonates in the main direction 11 and can transfer the oscillation to a mixing member attached to the shaft 6 outside the chassis 3, ideally to a mixer plate inside the medium to be mixed.

Figure 2:
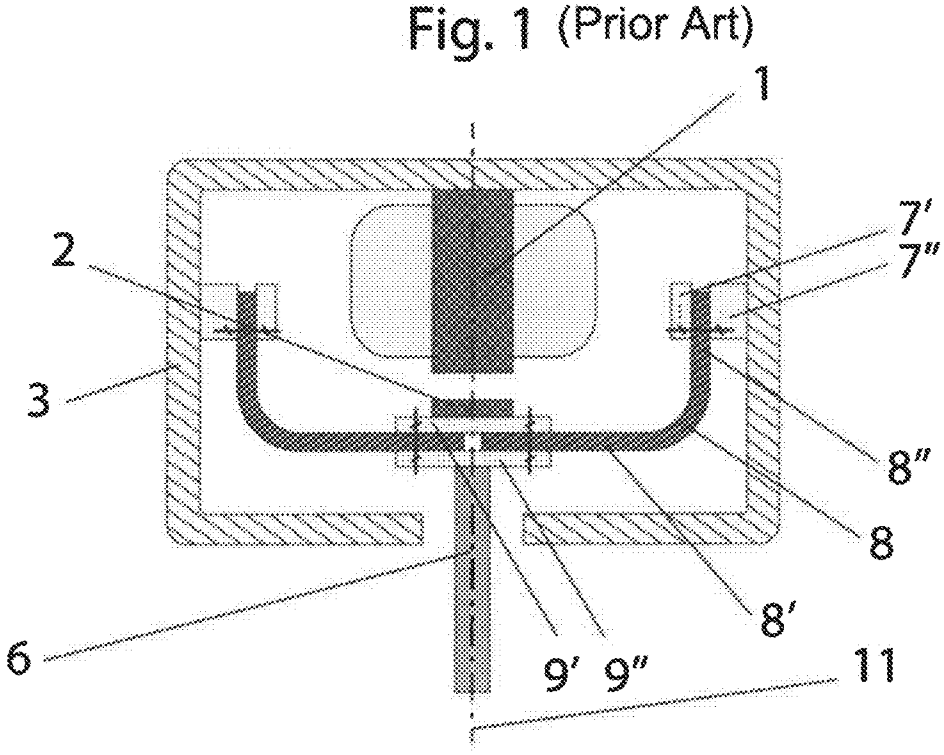
FIG. 2 shows a cross-section of the device according to the invention with simple L-profile spring elements.
Figure 3:
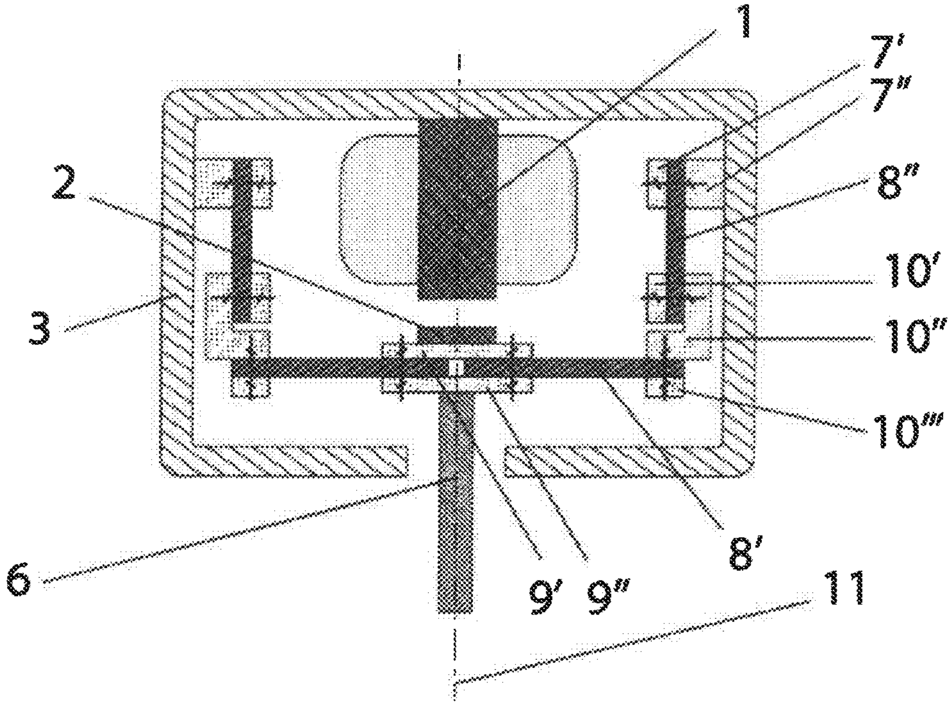
FIG. 3 shows a cross-section of the device according to the invention with a plurality of flat spring elements and their clamping mechanism.
Figure 4:
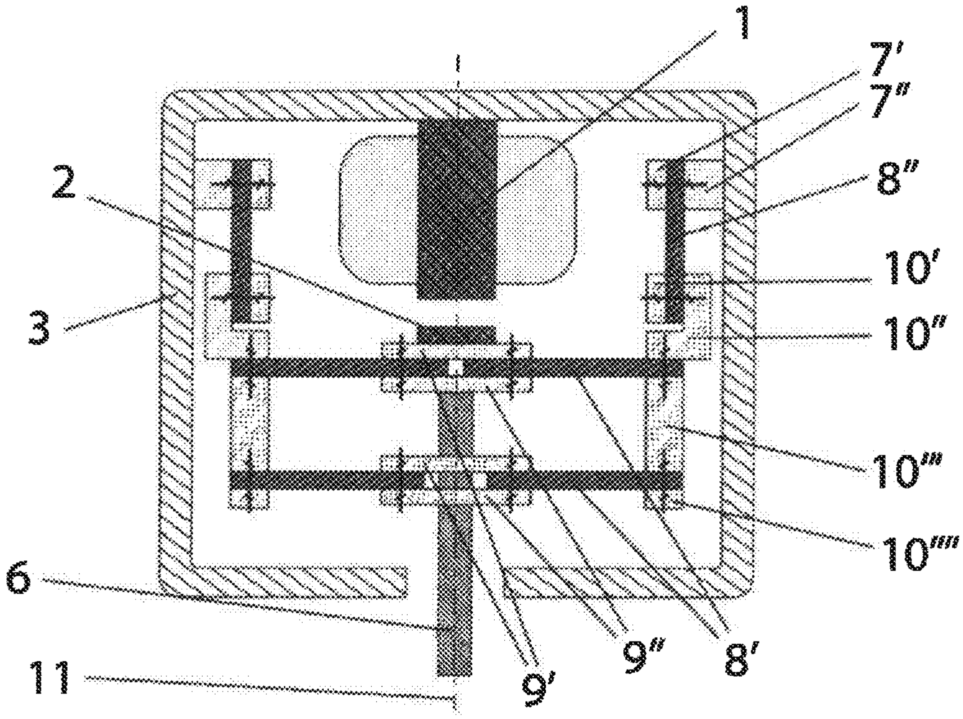
FIG. 4 shows a cross-section of the device according to the invention with a plurality of flat spring elements and their clamping mechanism in a double design.

FIGS. 2 to 4 show an exemplary embodiment of the device according to the invention for generating vibratory movements by means of a system consisting of one or more flat spring elements.

FIG. 2 shows the device according to the invention with an electromagnetic drive 1 attached to a housing 3, a drive shaft 6, to which a mixing member (not shown) is attached outside the housing 3, and a permanent magnet or magnetisable element 2. Two individual curved, here L-profile-shaped, flat spring elements 8 are connected to the permanent magnet or magnetisable element 2 by means of two clamping jaws 9, 9', with the L-shaped spring elements 8 having an element 8" running parallel to the shaft 6 and an element 8' running perpendicularly to the shaft 6. Instead of the two L-profile-shaped spring elements 8, a single spring element in the form of a U-profile can also be used. An alternating magnetic field generated by the electromagnetic drive 1 excites the permanent magnet or the magnetisable element 2. The two spring elements 8 are in turn each supported by clamping jaws 7', 7" and fixed to the inner side wall of the housing 3. Due to the geometric dimensions of the flat springs 8, 8', 8", their material properties, their clamped lengths and the weight of the system, the springs 8 vibrate excited by the drive 1 in the main direction 11. A shaft 6 connected to the springs 8 transmits the vibrating movement to a mixing member outside the housing 3. The arrangement allows the loads to be distributed among the spring elements 8. In this case, the element 8' of the spring element 8 running perpendicularly to the shaft can absorb the loads in the main direction 11 by bending the spring element 8', and transverse forces are transmitted to the elements 8" of the spring element 8 parallel to the main direction and the shaft. This allows an optimal distribution of the mechanical loads and thus an efficient use of the material properties of the springs 8.

FIG. 3 shows another embodiment of the device according to the invention. Instead of L-shaped, curved, flat spring elements 8, a plurality of flat spring elements 8', 8" are used, with the spring elements 8' again being oriented horizontally and perpendicularly to the main direction 11 and the spring elements 8" being parallel to the main direction 11. The spring elements 8', 8" are connected to each other by clamping jaws 10', 10", 10'", with the spring elements 8' being connected to the permanent magnet or magnetisable dement 2 by means of clamping jaws 9', 9". The spring elements 8" are in turn attached to and supported on the lateral inner wall of the housing 3 by means of clamping jaws 7, 7". A distinction is also made here between the spring elements 8' parallel to the main direction 11 and the spring elements 8" perpendicular to the main direction 11, which, depending on the load state, absorb the mechanical forces accordingly and thus optimally.

In an alternative embodiment with damping blocks (silent blocks) for the first spring elements 8" running parallel to the main direction 11, the first spring elements 8" together with the clamping jaws 7', 7", 10', 10" are replaced by damping blocks. One of the two metal plates of the damping blocks is attached here directly to the inner side walls of the housing 3 on one side of the damping material, and the other metal plate is attached to the clamping jaw 10'" on the opposite side of the damping material.

FIG. 4 also shows another embodiment of the device. Here, the spring system has two spring elements 8' arranged perpendicularly to the main direction 11, which are arranged one above the other. One of the spring elements 8' is attached to the permanent magnet or magnetisable element 2 by means of clamping jaws 9', 9", and the second spring element 8' is attached to the drive shaft 2 by means of clamping jaws 9', 9". The two spring elements 8' arranged one above the other and running perpendicularly to the drive shaft 2 are connected to each other by means of clamping jaws 10'" and 10"" and fixed to each other. Two spring elements 8" running parallel to the main direction 11 are attached to the inner side wall of the housing by means of clamping jaws 7', 7". The spring elements 8" running parallel to the drive shaft are fixed to each other with one spring element 8' running perpendicularly to the drive shaft 2 by means of clamping jaws 10', 10". This clamping of the spring elements 8', 8" supports the vibration in the main direction 11 and the loads are optimally absorbed by it. This parallel arrangement of a plurality of spring elements 8', 8" enables the drive shaft 6 to be better supported with respect to external forces.

The clamped lengths of the spring elements 8', 8" and 9', 9" and the position of the permanent magnet or magnetisable element 2 in relation to the electromagnetic drive 1 are important operating parameters and influence the vibration behaviour and thus the mixing capacity of the mixing member. The clamping jaws 10', 10", 10'" and 10"" are each designed in such a way that, preferably, they may be fixed flexibly, since the spring elements 8', 8" and 9', 9" can be attached in adjustable clamped lengths, widths and thicknesses as well as in different positions.

Figure 5:
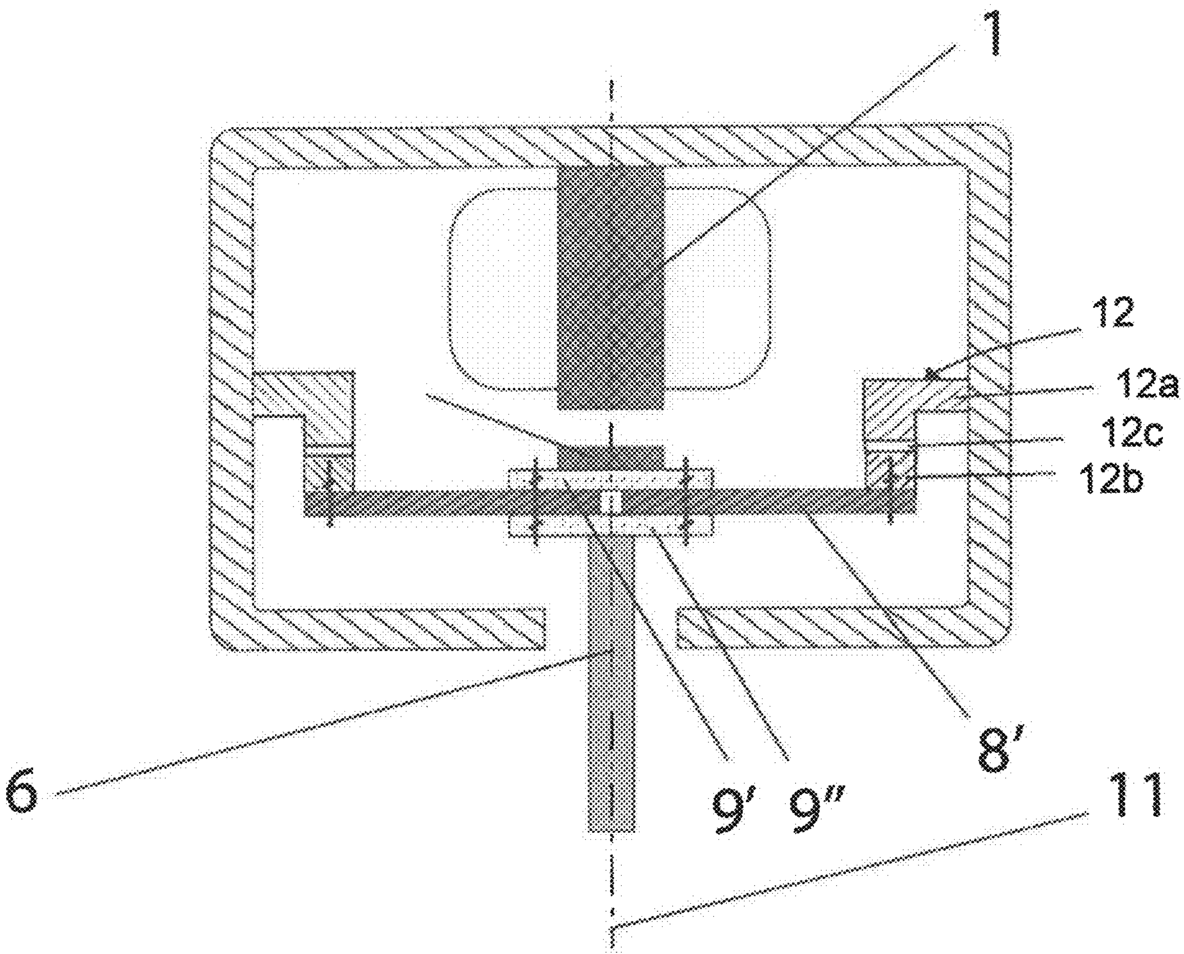
FIG. 5 shows a cross section of the device according to the invention with damping blocks.

FIG. 5 shows a modification of the embodiment of FIG. 3. Here, the first spring elements 8" and the clamping jaws 7', 7", 10' and 10" are each replaced by a damping block 12, which comprises two metal plates **12*a*, 12*b* and a shock-absorbing material 12*c* arranged between the two metal plates 12*a*, 12*b*. The damping block 12 is directly attached to the inner side well of the housing 3**.

What is claimed is:

1. A device for mixing liquids and solids in liquids, said device comprising:

an electromagnetic drive;

a drive shaft arranged coaxially with the electromagnetic drive, said drive shaft having a mixing member and either a permanent magnet or a magnetisable element excitable by the electromagnetic drive to cause vibration for transmission to the mixing member; and a system of flat spring elements comprising a first spring element arranged parallel to the drive shaft and a second spring element arranged perpendicularly to the drive shaft and connected to the permanent magnet or the magnetisable element.

2. The device of claim 1, wherein the flat spring elements are connected to each other.

3. The device of claim 1, wherein one of the flat spring elements is curved.

4. The device of claim 1, wherein one of the flat spring elements has a U-shaped configuration shaped to define the first spring element and the second spring element.

5. The device of claim 1, wherein the spring elements are made of resilient, elastic material.

6. The device of claim 1, wherein the spring elements are made of spring steel or fibre-reinforced plastic.

7. The device of claim 1, further comprising a housing and clamping jaws, said first spring element being attached and mounted on a wall of the housing by the clamping jaws.

8. The device of claim 1, further comprising clamping jaws configured to attach and mount the second spring element on the permanent magnet or the magnetisable element.

9. The device of claim 1, further comprising a housing, first clamping jaws configured to attach and mount the first spring element on a wall of the housing, and second clamping jaws configured to attach and mount the second spring element on the permanent magnet or the magnetisable element, said first and second clamping jaws being configured to enable adjustment of a clamped length and a clamped width of the first and second spring elements when being clamped in the first and second clamping jaws.

10. The device of claim 1, wherein a distance of the spring elements from the electromagnetic drive is adjustable.

11. The device of claim 1, further comprising a housing, said first spring element being formed by a damping block, which is directly attached to an inner wall of the housing.

* * * * *